J. E. A. Gibbs,
Wood Clamp.
N° 16,642.  Patented Feb. 17, 1857.
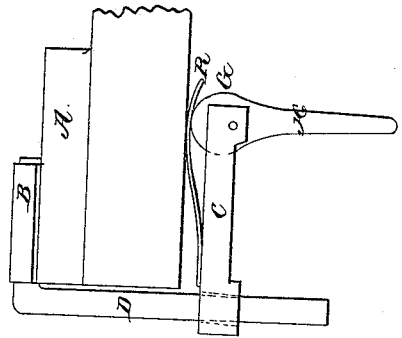
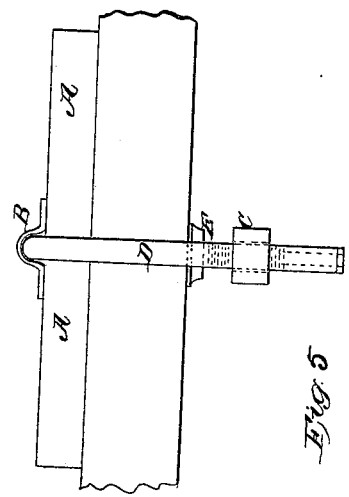
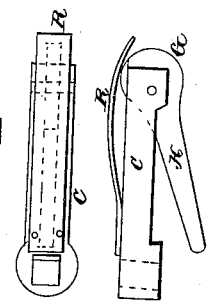
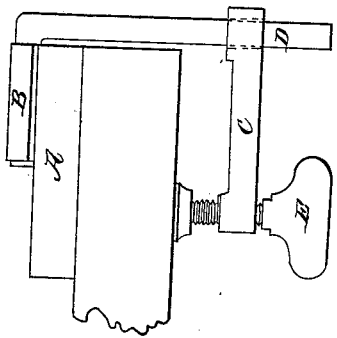
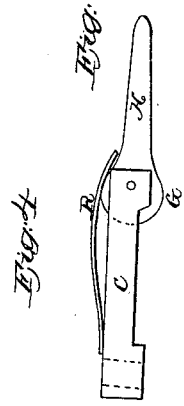

UNITED STATES PATENT OFFICE.

JAMES E. A. GIBBS, OF MILLPOINT, VIRGINIA.

CARPENTER'S BENCH-CLAMP.

Specification of Letters Patent No. 16,642, dated February 17, 1857.

*To all whom it may concern:*

Be it known that I, JAMES E. A. GIBBS, of Millpoint, in the county of Pocahontas and State of Virginia, have invented certain new and useful Improvements in Clamps; and I do hereby declare that the following is a full, exact, and clear description thereof, reference being had to the accompanying drawing, in which—

Figures 1, 2, 3, 4, 5, and 6 represent different views and modifications of my improved clamp.

Numerous implements and machines are employed in machine shops as well as in households, which require by their nature of operation to be steadily fixed to tables or benches, or other similar objects during the performance of the work they are intended for. A great number of devices have been used and suggested for fastening these implements to tables or benches, but none to my knowledge answer the purpose perfectly with regard to convenience, solidity and steadiness.

The annexed drawing represents a clamp constructed on a new principle which admits of a ready and convenient mode of securing to any part of a table or bench, implements or machines attached to the platform A. This platform is furnished with a sleeve or journal B into which a bent rod is set and is capable of a movement of rotation the said journal or sleeve being the pivot. The rod is bent into a rectangular shape, the shank or vertical portion of which is of a square section for the purpose of preventing its vertical rotation.

A lever or arm C capable of sliding up and down the shank D bears on its extremity a screw E, Figs. 1 and 2, or a cam G operated by its stem H, which will effect the proper tension between the horizontally bent portion of the rod D and the arm or lever C. The square hole into which the rod D passes should be slightly inclined so as to appear at right angles with the shank when under strain. Upon the top of the cam a spring R is applied which answers a double purpose, that of preserving the table from injury and to keep the cam in its extreme position as shown in Figs. 4, 5, and 6.

The operation is as follows: The arm C is slid on the rod to a proper height until its other extremity touches the underside of the table, then the screw is turned which in bringing down the forward end of the arm C causes the rod to be jammed between the mortise forming a most perfect and rigid joint. The screw has thus a small distance to travel, to secure a perfect attachment. The operation is similar with the cam; when the arm C is raised, the cam occupies the position shown in Figs. 4, 5, and 6, when the top of the spring touches the table the stem is turned down; the eccentric forces the end of the arm down and thus produces the tension required. The pivot B is very convenient inasmuch as the whole clamp can be turned out of the way without being detached therefrom when the machine or implement is not in use.

Having now fully described my improvement, I do not wish to confine myself to the particular devices I have described, as numerous contrivances may be imagined to operate clamps on the same principle but

What I claim as my invention and desire to secure by Letters Patent is:

Combining the pivoted and bent clamp rod D with the sliding arm or lever C, when the latter is so arranged as to jam the rod at any required height, by means of a screw, cam or any equivalent mechanical contrivance.

In testimony whereof I have signed my name to this specification before two subscribing witnesses.

JAMES E. A. GIBBS.

Witnesses:
 A. POLLAK,
 CHAS. EVERETT.